United States Patent [19]
Michalina

[11] Patent Number: 5,717,948
[45] Date of Patent: Feb. 10, 1998

[54] INTERFACE CIRCUIT ASSOCIATED WITH A PROCESSOR TO EXCHANGE DIGITAL DATA IN SERIES WITH A PERIPHERAL DEVICE

[75] Inventor: Jean-Claude Michalina, Sassenage, France

[73] Assignee: SGS-Thomson Microelectronics S.A., Saint Genis, France

[21] Appl. No.: 335,472

[22] Filed: Nov. 7, 1994

[30] Foreign Application Priority Data

Nov. 26, 1993 [EP] European Pat. Off. .............. 93402872

[51] Int. Cl.$^6$ ................................................ G06F 13/00
[52] U.S. Cl. ...................... 395/821; 395/309; 395/824; 395/854; 395/872; 395/891
[58] Field of Search ..................... 395/821, 824, 395/839, 842, 850, 852–854, 872–873, 878, 881, 882, 551, 840, 556, 841, 250, 891, 309

[56] References Cited

U.S. PATENT DOCUMENTS

| | | | |
|---|---|---|---|
| 4,807,121 | 2/1989 | Halford | 395/873 |
| 5,124,980 | 6/1992 | Maki | 370/77 |
| 5,138,611 | 8/1992 | Cam et al. | 370/60 |
| 5,163,132 | 11/1992 | DuLac et al. | 395/873 |
| 5,208,913 | 5/1993 | Yamamoto | 395/853 |
| 5,228,129 | 7/1993 | Bryant et al. | 395/853 |
| 5,448,701 | 9/1995 | Metz, Jr. et al. | 395/873 |

FOREIGN PATENT DOCUMENTS

| | | | |
|---|---|---|---|
| A-0218955 | 4/1987 | European Pat. Off. | G06F 13/42 |
| A-2636448 | 11/1990 | France | G06F 13/38 |

*Primary Examiner*—Jack B. Harvey
*Assistant Examiner*—Ario Etienne
*Attorney, Agent, or Firm*—Wolf, Greenfield & Sacks, P.C.; James H. Morris; Richard F. Giunta

[57] ABSTRACT

An interface circuit disposed between a processor and a peripheral device to facilitate the transfer of data therebetween. The interface circuit includes at least one buffer memory connected firstly to the data bus of the processor and secondly to the parallel port of a conversion register whose series port is connected to the peripheral device. A counter generates a first address and a first memory access control signal given to a selection circuit that also receives a second address and a second memory access control signal coming from the processor. Depending on a selection signal, the circuit sends either the first address and the first control signal or the second address and the second control signal to the buffer memory. Thus, data transferred between the processor and the peripheral is passed through the buffer memory.

18 Claims, 2 Drawing Sheets

INTERFACE CIRCUIT ASSOCIATED WITH A PROCESSOR TO EXCHANGE DIGITAL DATA IN SERIES WITH A PERIPHERAL DEVICE

BACKGROUND OF THE INVENTION

1. Field of the Invention

The present invention relates to an interface circuit associated with a processor to exchange digital data in series with a peripheral device.

2. Discussion of the Related Art

This circuit is of the synchronous interface type, i.e. the digital data elements are in the form of binary frames sent out at the rate of a clock signal and referenced by a synchronization signal, these two signals also being transmitted between the processor and the peripheral device during the data exchange.

Usually, since the processor works with data elements in parallel (for example by sixteen-bit words), this interface function is fulfilled by a conversion register that is typically a FIFO (first-in-first-out) register with a series port connected to the peripheral device and a parallel port connected to the data bus of the processor. In the case of an input interface, the reception of each sixteen-bit word by the processor necessitates an interruption of the execution of the program by the processor so that this word can be read in the conversion register and stored in a RAM internal register with an output of addresses and corresponding control signals: this requires about ten clock cycles of the processor. Symmetrically, in the case of an output interface, the sending of each sixteen-bit word by the processor necessitates an interruption of the program in order to read this word in an internal register and write it in the conversion register. These transmission/reception tasks use a non-negligible portion of the processing capacity of the processor, notably when a frame of data elements in series includes several sixteen-bit words. This portion amounts to about 15% in the typical case of a processor having a clock frequency of 10 MHz connected to a peripheral device enabling a two-way data exchange in series at a clock frequency of 10 kHz (for example, an analog front-end processor in the case of an application to a modem).

The aim of the present invention is to propose an interface circuit which, when associated with a processor, makes it possible to relieve this processor of a certain number of tasks and interruptions, and hence enables better use to be made of its processing capacities.

SUMMARY OF THE INVENTION

According to a first object of the invention, there is proposed an interface circuit associated with a processor to exchange digital data elements in series with a peripheral device, the digital data elements being in the form of binary frames, sent out at the rate of a serial clock signal, referenced by a synchronization signal and each including at least one data word. In one illustrative embodiment, the interface circuit includes at least one buffer memory having a parallel data input, a parallel data output, an address input, a write control input and a read control input. The interface circuit further includes a first data transfer line connected to the data input of the buffer memory, a second data transfer line connected to the data output of the buffer memory, and a conversion register. The conversion register has its rate set by the serial clock signal, a series port that can be connected to the peripheral device, and a parallel port that can be connected to one of said first and second data transfer lines. The other data transfer line is connected to a data bus of the processor. A control circuit, including a counter receiving the clock signal and the synchronization signal, produces a first address that is incremented substantially at the end of each serially exchanged word, a first memory access control signal activated substantially at the end of each serially exchanged word, and a buffer memory selection signal. A selection circuit, depending on the state of the buffer memory selection signal, respectively transmits the first address and the first memory access control signal to the address input and to a control input of the buffer memory, or respectively transmits a second address coming from the processor and a second memory access control signal coming from the processor to the address input and to a control input of the buffer memory.

The buffer memory is used to accumulate data frames before their serial transmission or after their serial reception. In one embodiment of the invention, the transfer of the data elements between the buffer memory and the conversion memory is done at a rate that is related to the rate of transmission or reception of the words and referenced by the counter of the control means on the basis of the clock and synchronization signals, while the transfer of data between the buffer memory and the processor can be done in a grouped way and at the rate of the clock of the processor, i.e. generally at far greater speed. The transfer of a group of data elements requires only one interruption of the processor and fewer instructions than in the case of the successive transfers of individual words.

In an advantageous embodiment of the invention, the interface circuit has two buffer memories, each having a parallel data input connected to the first data transfer line, a parallel data output connected to the second data transfer line, an address input, a write control input and a read control input. Additionally, the selection circuit is organized so as to respectively transmit the first address and the first memory access control signal to the address and control inputs of one of the buffer memories selected as a function of the buffer memory selection signal, and to respectively transmit the second address coming from the processor and the second memory access control signal coming from the processor to the address and control inputs of the other buffer memory.

The use of two buffer memories and of the selection means, in the case of an input circuit, enables the circuit to continue receiving data elements in a buffer memory while the processor is reading previous data elements in the other buffer memory. In the case of an output circuit, this use enables the processor to write data elements in a buffer memory while other data elements, written previously in the other buffer memory, are transmitted towards the peripheral device.

The interface circuit may be arranged so as to receive the clock and synchronization signals from the peripheral device or to generate these signals itself from another clock signal with a higher frequency coming from the processor.

In a preferred version of the circuit, the control circuit is arranged so as to modify the state of the buffer memory selection signal when a number of frames corresponding to the capacity of a buffer memory has been exchanged. The processor may thus successively read or write groups of data elements that always have the same number of frames (corresponding to the capacity of a buffer memory). The second addresses, generated by the processor for these reading or writing operations, are furthermore always the same.

In another illustrative embodiment of the invention, an interface circuit is provided that is associated with a processor for a two-way exchange of digital data between the processor and a peripheral device, the data elements being in the form of binary frames sent out at the rate of a clock signal, referenced by a synchronization signal and including at least one data word. The interface circuit includes at least one transmission buffer memory and at least one reception buffer memory, each of these buffer memories having a parallel data input, a parallel data output, an address input, a write control input and a read control input. The data output of the reception buffer memory and the data input of the transmission buffer memory each being connected to a data bus of the processor. The interface circuit further includes a parallel/series conversion register having its rate set by the clock signal and having a series output that can be connected to the peripheral device and a parallel input connected to the data output of the transmission buffer memory. Additionally, a series/parallel conversion register is provided having its rate set by the clock signal and having a series input that can be connected to the peripheral device and a parallel output connected to the data input of the reception buffer memory. The interface circuit further includes a control circuit, a transmission selection circuit, and a reception selection circuit. The control circuit includes a counter receiving the clock signal and the synchronization signal to produce a first read address incremented substantially at the end of each word transmitted serially towards the peripheral device, a first read control signal activated substantially at the end of each word transmitted serially towards the peripheral device, a first write address incremented substantially at the end of each word received serially from the peripheral device, a first write control signal activated substantially at the end of each word received serially from the peripheral device, a transmission buffer memory selection signal, and a reception buffer memory selection signal. The transmission selection circuit, depending on the sate of the transmission buffer memory selection signal, respectively transmits the first read address and the first read control address to the address input and to the read control input of the transmission buffer memory or, respectively, a second write address coming from the processor and a second write control signal coming from the processor to the address and write control inputs of the transmission buffer memory. The reception selection circuit, depending on the state of the reception buffer memory selection signal, respectively transmits the first write address and the first write control signal to the address input and to the write control input of the reception buffer memory, or respectively transmits a second read address coming from the processor and a second read control signal coming from the processor to the address and read control inputs of the reception buffer memory. The control circuits for transmission and for reception may be at least partially merged into one and the same circuit.

In a preferred version of this two-way interface circuit, the first write control signal and the first read control signal are one and the same signal, and the first write address is identical to the first read address shifted substantially by a half-cycle of the clock signal. In this way, the transmission of data in series towards the peripheral device and the reception of data in series from the peripheral device may be perfectly synchronized and in phase.

Preferably, the second write address and the second read address are one and the same address coming from the processor. The same bus address of the processor is then used for the transmission and for the reception of data. This does not prevent the processor from being capable of both reading in the reception buffer memories and writing in the transmission buffer memories: it is enough to allocate the same addresses to the locations of the transmission and reception buffer memories.

BRIEF DESCRIPTION OF THE DRAWINGS

Other features and advantages of the invention shall appear from the following detailed description of a preferred, non-restrictive example of an embodiment, taken together with the appended drawings, of which.

DETAILED DESCRIPTION

Figure 1:
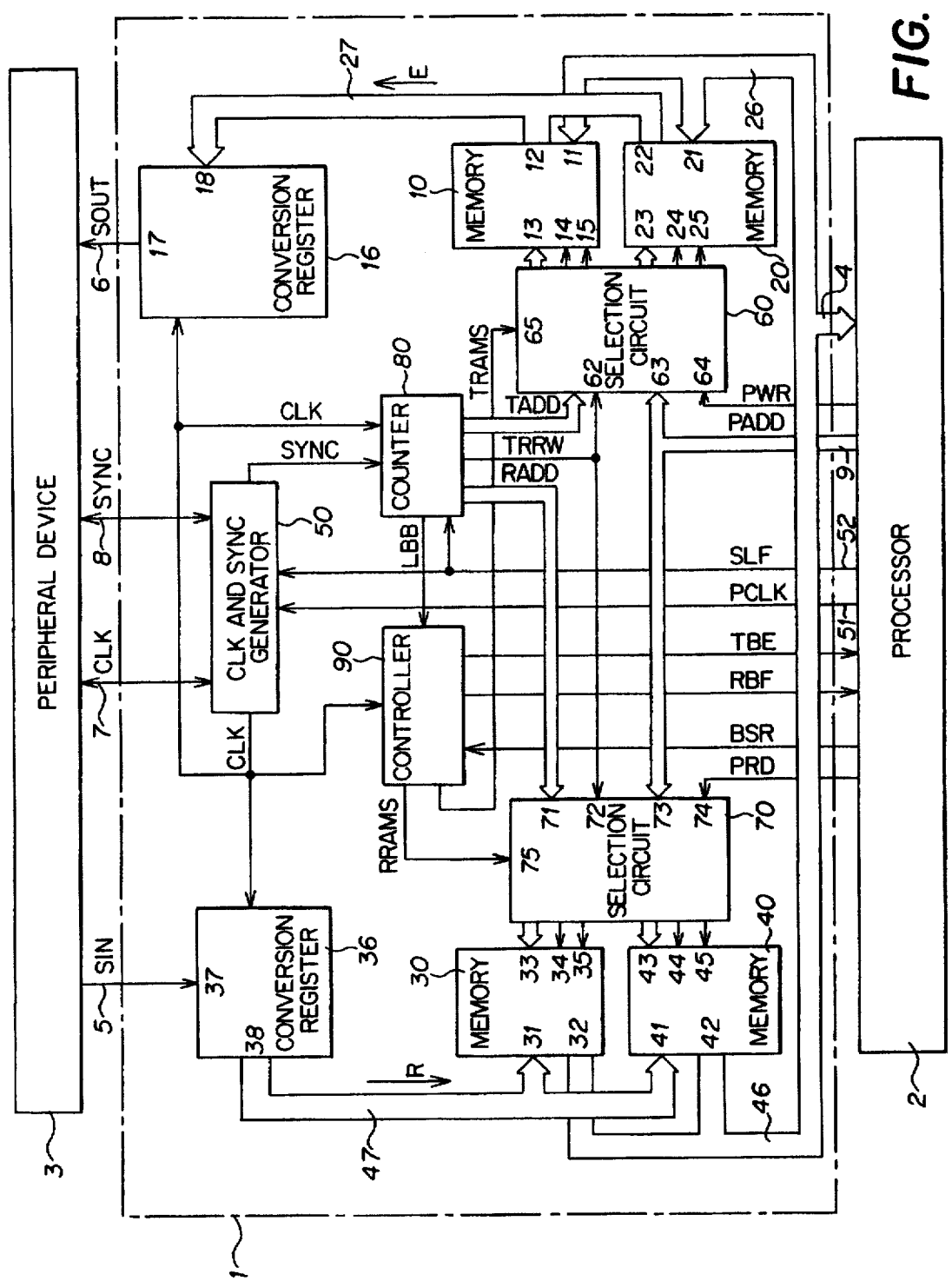
FIG. 1 is a diagram of a two-way interface circuit according to the invention.

FIG. 1 shows an illustrative interface circuit 1 according to the invention, associated with a processor 2 (i.e. forming part of one and the same integrated circuit chip) and connected to a peripheral device 3. The data elements are exchanged by the processor 2 through a sixteen-bit data bus 4, are received from the peripheral device by a series line 5 and are transmitted to the peripheral device by a series line 6. Between the circuit 1 and the peripheral device 3, the data exchanged are in the form of frames each corresponding to one or more sixteen-bit words transmitted on the data bus 4, sent out at the rate of a clock signal CLK, and referenced by a synchronization signal SYNC.

The clock signal CLK and the synchronization signal SYNC are divided between the circuit 1 and the peripheral device 3 by means of respective lines 7, 8. They may be either received from the peripheral device 3 or produced by a generator 50 included in the circuit 1 on the basis of a clock signal PCLK received from the processor 2 by a clock line 51. The signal PCLK comes from the clock of the processor 2 itself and normally has a frequency that is appreciably higher than that of the clock signal CLK used for the exchange of data in series. The generator 50 furthermore receives configuration signals from the processor 2, these signals being designated collectively by the reference SLF in FIG. 1 and being transmitted by lines 52. These configuration signals SLF are used to determine the ratio of the frequencies between the clocks signals PCLK and CLK to shape the clock and synchronization signals produced by the generator 50 and to select the source of the signals CLK, SYNC used (peripheral device 3 or generator 50).

The generator, shown schematically at 50, applies the selected clock signal CLK and synchronization signal SYNC to the circuit 1 as well as to the peripheral device 3 when this device is not selected as a source of the signals CLK and SYNC. The circuit 1 may thus, in modifying the configuration signals SLF, be used to exchange data elements with different types of peripheral devices.

For example, the processor 2 may be of the ST18933 type, marketed by the firm SGS-Thomson Microelectronics and, in the case of an application to a modem, the peripheral device 3 may be an analog front-end processor of the ST7543 type marketed by the firm SGS-Thomson Microelectronics. In the example of this peripheral device, a frame consists of four sixteen-bit words. The start of a frame is referenced by a pulse at a logic level 1 in the signal SYNC, the signals CLK and SYNC are received from the peripheral device, the data received on the line 5 are sampled on the trailing edge of the clock signal CLK and the elements are transmitted on the line 6 on the leading edge of the clock signal CLK. The processor will then deliver appropriate configuration signals SLF on the line 52.

The interface circuit 1 has a parallel/series conversion register 16 and a series/parallel conversion register 36, which are two standard FIFO type sixteen-bit registers, having their rate set by the clock signal CLK. The register 16, used for the transmission of data, has a parallel input 18 connected to a data transfer line 27 and a series output 17 capable of being connected to the peripheral device 3 by the line 6. The register 36, used for the reception of data, has a series input 37 capable of being connected to the peripheral device 3 by the line 5 and a parallel output 38 connected to a data transfer line 47.

The interface circuit 1 furthermore comprises two transmission buffer memories 10, 20 and two reception buffer memories 30, 40, each having: one input of data in parallel on sixteen bits, 11, 21, 31, 41; one output of data in parallel on sixteen bits 12, 22, 32, 42; one address input on four bits, 13, 23, 33, 43; one write control input 14, 24, 34, 44, and one read control input, 15, 25, 35, 45. The data outputs 12, 22 of the transmission buffer memories 10, 20 are connected to the data transfer line 27 and hence to the parallel input 18 of the register 16. The data inputs 11, 21 of the transmission buffer memories 10, 20 are connected to another data transfer line 26 which is itself connected to the data bus 4 of the processor 2. The data inputs 31, 41 of the reception buffer memories are connected to the data transfer line 47 and hence to the parallel output 38 of the register 36. The data outputs 32, 42 of the reception buffer memories 30, 40 are connected to a data transfer line 46 which is itself connected to the data bus 4 of the processor 2.

In the example described herein, each of the memories 10, 20, 30, 40 has a capacity of sixteen words of sixteen bits (giving four frames of 4×16 bits), the locations of which are referenced by the four-bit address received at the input 13, 23, 33, The address inputs 13, 23 and the control inputs 14, 15, 24, 25 of the transmission buffer memories 10, 20 are respectively connected to corresponding outputs of a transmission selection circuit 60. The selection circuit 60 furthermore has an input on four bits 61 capable of receiving a first read address TADD, an input 62 capable of receiving a read control signal TRRW, an input 63 on four bits connected to the address bus 9 of the processor 2 to receive a write address PADD coming from the processor 2, an input capable of receiving a write control signal PWR coming from the processor 2, and an input 65 capable of receiving a transmission buffer memory selection signal TRAMS.

The selection circuit 60 enables the selection of one of the transmission buffer memories 10, 20 to give data elements to the register 16 as a function of the transmission buffer memory selection signal TRAMS. When TRAMS is at the logic level 0, the memory 10 is selected and the circuit 60 transmits the read address TADD to the address input 13 of the memory 10 and the read control signal TRRW to the read control input 15 of the memory 10, while it transmits the write address PADD to the address input 23 of the other memory 20 and the write control signal PWR to the write control input 24 of the other memory 20. When TRAMS is at the logic level 1, the memory 20 is selected and the circuit 60 transmits the read address TADD to the address input 23 of the memory 20 and the read control signal TRRW to the read control input 25 of the memory 20, while it transmits the write address PADD to the address input 13 of the other memory 10 and the write control signal PWR to the write control input 14 of the other memory 10.

The address inputs 33, 43 and the control inputs 34, 35, 44, 45 of the reception buffer memories 30, 40 are respectively connected to corresponding outputs of a reception selection circuit 70. The selection circuit 70 furthermore has an input on four bits 71 capable of receiving a first write address RADD, an input 72 capable of receiving a write control signal TRRW, an input 73 on four bits connected to the address bus 9 of the processor 2 to receive a read address PADD coming from the processor 2, an input 74 capable of receiving a read control signal PRD coming from the processor 2, and an input 75 capable of receiving a reception buffer memory selection signal RRAMS.

The selection circuit 70 is analogous to the previously described circuit 60. It enables the selection of one of the reception buffer memories 30, 40 to receive data elements from the register 36 as function of the reception buffer memory reception signal RRAMS. When RRAMS is at the logic level 0, the memory 30 is selected and the circuit 70 transmits the write address RADD to the address input 33 of the memory 30 and the write control signal TRRW to the write control input 34 of the memory 30, while it transmits the read address PADD to the address input 43 of the other memory 40 and the read control signal PRD to the read control input 45 of the other memory 40. When RRAMS is at the logic level 1, the memory 40 is selected and the circuit 70 transmits the write address RADD to the address input 43 of the memory 40 and the write control signal TRRW to the write control input 44 of the memory 40, while it transmits the read address PADD to the address input 33 of the other memory 30 and the read control signal PRD to the read control input 35 of the other memory 30.

It is noted that the read control signal intended for the transmission buffer memories 10, 20 and the write control signal intended for the reception buffer memories 30, 40 are one and the same signal TRRW. This signal is active at the low level (TTRW =0) and inactive at the high level (TRRW =1). Furthermore, the write address intended for the transmission buffer memories 10, 20 and the read address intended for the reception buffer memories 30, 40 are one and the same address PADD delivered by the processor 2 on its address bus 9.

The interface circuit 1 comprises yet other control means including a counter 80 and a controller 90. The counter 80 receives the clock signal CLK and the synchronization signal SYNC and, as a function of these signals CLK, SYNC, produces the read/write control signal TRRW addressed to the inputs 62, 72 of the selection circuits 60, 70, the read address TADD addressed to the input 61 of the selection circuit 60, and the write address RADD addressed to the input 71 of the selection circuit 70. The signal TRRW is activated at the end of each sixteen-bit word sent or received in series by the interface circuit 1. The read address TADD is incremented by one unit at the end of each word transmitted serially to the peripheral device 3. The write address RADD is incremented at the end of each word received serially from the peripheral device 3. To identify the end of the words, the counter 80 counts four times sixteen cycles of the clock signal CLK after each pulse of the synchronization signal SYNC. To know the waveform of the signals CLK and SYNC, it being possible for the number of words per frame or other parameters to vary according to the application of the interface circuit, the counter 80 has an input connected to the line 52 to receive the configuration signals SLF from the processor 2.

To make the serial transmission and reception of the frames perfectly synchronous and in phase, the same control signal TRRW is used for reading in the memories 10, 20 and for writing in the memories 30, 40 as explained here above and, furthermore, the write address RADD is identical with the read address TADD shifted by about one half-cycle of the clock cycle CLK.

Figure 2:
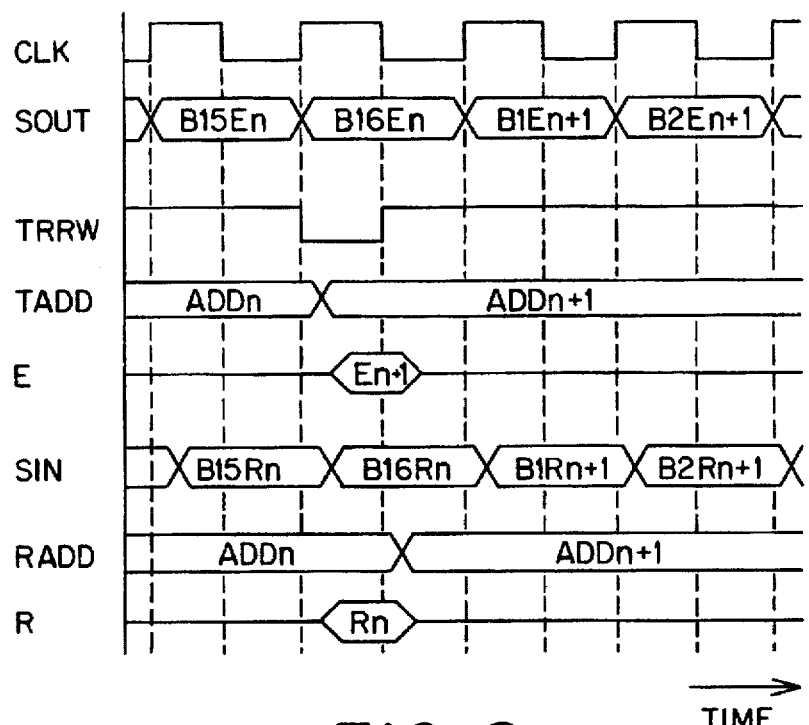
FIG. 2 is a timing diagram of different signals used for the operation of the circuit of FIG. 1.

The corresponding operation of the counter 80 is illustrated by the timing diagrams of FIG. 2. The output signal SOUT transmitted on the line 6 presents the succession of data bits B15En, B16En, B1En+1, B2En+1 etc. at the rate of the clock signal CLK, and the input signal SIN received on the line 5 presents the succession of data bits B15Rn, B16Rn, B1Rn+1, B2Rn+1 ... at the rate of the clock signal CLK, the words sent En, En+1 and the words received Rn, Rn+1 being in phase on the respective lines 6, 5. When the counter 80 has detected the last bit B16En of a sixteen-bit word En sent, it produces a pulse at a logic level 0 of the signal TRRW during the half-cycle C1K=1, and, at the same time, it increments the read address TADD by one unit. The signal TRRW and the read address TADD are transmitted by the selection circuit 60 to the read control input 15, 25 and to the address input 13, 23 of one of the transmission buffer memories 10, 20 containing the next word to be transmitted En+1. This word En+1 is presented on the line 27 (line E in FIG. 2), and then locked in the register 16 at the leading edge of the signal TRRW with a view to the series transmission of its bits B1En+1, B2En+1 that control the following cycles of the clock signal CLK.

When the counter 80 has detected the last bit B16Rn of a received sixteen-bit Rn, it increments the write address RADD by one unit after the clock signal CLK has returned to the level 0 (i.e. a half-cycle after the incrementation of the read address TADD). Thus, the write address RADD is not yet incremented at the leading edge of the control signal TRRW. The signal TRRW and the write address RADD are transmitted by the selection circuit 70 to the write control input 34, 44 and to the address input 33, 43 of one of the reception buffer memories 30, 40 having a location available to receive the sixteen-bit word Rn that has just been received and that is temporarily present in the register 36. This word Rn is presented at the line 47 (line R in FIG. 2), then stored in the memory 30, 40 at the instant of the leading edge of the signal TRRW at the address RADD=ADDN which has not yet been incremented and which therefore corresponds to the address TADD=ADDN which was the address, in the memory 10, 20, of the word En that has been sent out on the line 6 at the same time as the word Rn was received on the line 5. Thus, it is seen that the words En, Rn; En+1, Rn+1 which are sent out and received in phase on the lines 6, 5 are also stored at corresponding locations of the transmission and reception buffer memories.

The counter 80 also produces a signal LBB given to the controller 90, which gives a pulse with a logic level 1 and a duration equal to a cycle of the clock signal CLK when a number of frames corresponding to the capacity of one of the buffer memories 10, 20, 30, 40 (four in the example described herein) has been exchanged serially. The leading edge of the pulse of the signal LBB coincides with the trailing edge of the activation pulse of the control signal TRRW resulting from the detection of the last bit of the last word of the succession of frames whose number corresponds to the capacity of a buffer memory 10, 20, 30, 40. To produce the signal LBB, the counter 80 therefore counts the frames referenced by the synchronization signal SYNC. The number of frames per memory can vary according to the application of the interface circuit and can be indicated to the counter 80 by means of the configuration signals SLF.

The controller 90 is used notably to produce the buffer memory selection signals TRAMS and RRAMS. Its operation is illustrated by the timing diagrams of FIG. 3. The controller 90 receives the clock signal CLK, the signal LBB coming from the counter 80 and a binary validation signal BSR coming from the processor 2. The controller 90 changes the state of the transmission buffer memory selection signal TRAMS at each leading edge of the signal LBB, i.e. substantially at the same time as the counter 80 increments the read address TADD in response to the transmission of the last word of the succession of frames on the line 6. The controller 90 changes the state of the reception buffer memory selection signal RRAMS one half-cycle of the clock signal CLK after having changed the state of the other selection signal TRAMS, i.e. substantially at the same time as the counter 80 increments the read address RADD in response to the reception of the last word of the succession of frames on the line 5. This shift of one half-cycle between the modifications of the addresses TRAMS and RRAMS is made, for the same reason as the shift between the incrementations of the addresses TADD and RADD, in order to carry out a transmission and a reception of phase frames.

When TRAMS is at the level 0, the data words present in the transmission buffer memory 10 are sent successively to the register 16 (pulses of the control signal TRRW and incrementations of the read address TADD), and transmitted in series on the line 6 once the entire contents of the memory 10 have been transmitted in this way, the pulse of the signal LLB prompts a modification of the transmission buffer memory selection signal TRAMS, so that the next words to be sent out are read in the other transmission buffer memory 20. At the same time as it modifies the signal TRAMS, the controller 90 sends the processor 2 an end-of-transmission signal TBE (FIGS. 1 and 3) to inform it that the entire contents of the memory 10 have been transmitted. The processor 2 can then write new data elements to be transmitted in the memory 10 (by producing addresses on the bus 9 and data elements on the bus 4 and by delivering pulses of the write control signal PWR) while the interface circuit serially sends out the words contained in the other transmission buffer memory 20, which is permitted by the state TRAMS=1 of the transmission buffer memory selection signal. The transition between the states 1 and 0 of the signal TRAMS is done in a way that is quite similar.

When RRAMS is at the level 0, the data words received in series by the register 36 are stored successively in the reception buffer memory 30 (pulses of the control signal TRRW and incrementations of the write address RADD) once the memory 30 has thus been completely filled with received words, the pulse of the signal LLB prompts a modification of the reception buffer memory selection signal RRAMS, so that the following words received will be stored in the other reception buffer memory 40. At the same time as it modifies the signal RRAMS, the controller 90 sends an end-of-transmission signal RBF (FIGS. 1 and 3) to the processor 2 to inform it that the memory 30 has been completely filled. The processor can then read the data elements present in this memory 30 (by producing addresses on the bus 9 and by delivering pulses of the read control signal PRD) while the interface circuit serially receives other words that it stores in the other reception buffer memory 40, which is permitted by the state RRAMS=1 of the reception buffer memory selection signal. The transition between the states 1 and 0 of the signal TRAMS is done in a way that is quite similar.

While the processor 2 is reading or writing data words in one of the buffer memories 10, 20, 30, 40, it places the validation signal BSR in the logic state 0. When it has finished reading and writing in the memories 10, 20, 30, 40, it places the validation signal BSR in the logic state 1. The controller 90 is organized so as to modify the signals TRAMS and RRAMS only if the validation signal BSR is in the state 1 (FIG. 3), which corresponds to a normal situation in view of the processing rate of the processor which is appreciably higher than that of the serial exchange of data.

Figure 3:
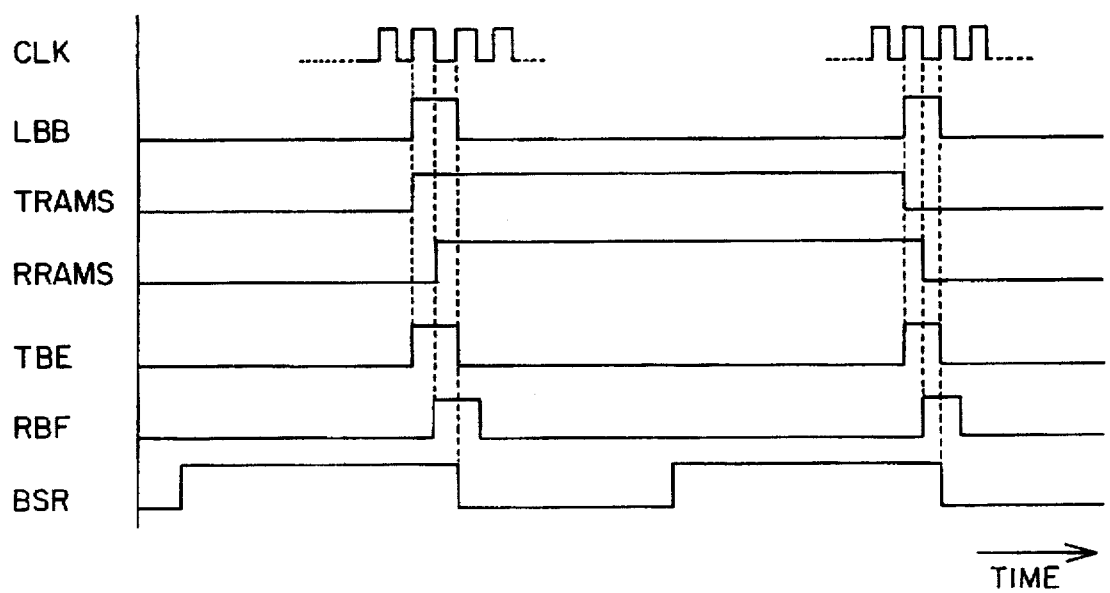
FIG. 3 is a timing diagram illustrating the working of a part of the circuit of FIG. 1.

A description has been given here above, with reference to FIGS. 1 to 3, of a two-way interface circuit according to the invention. The circuit according to the invention can also be made in a one-way (transmission or reception) version. Referring to FIG. 1, a transmission circuit may be obtained simply by eliminating the series/parallel register 36, the reception buffer memories 39, 40, the reception selection circuit 70 and the corresponding connections, the production of the address RADD and of the signals RRAMS and RBF by the control means 80, 90 being then unnecessary. Similarly, a reception circuit can be obtained simply by eliminating the parallel/series register 16, the transmission buffer memories 10, 20, the transmission selection circuit 60 and the corresponding connections, the production of the address TADD and of the signals TRAMS and TBE by the control means 80, 90 being then unnecessary. It is also possible to make a one-way exchange by using the entire circuit shown in FIG. 1 by and connecting only one of the series lines 5, 6 to the peripheral device 3.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An interface circuit associated with a processor to serially exchange words of digital data between the processor and a peripheral device, the digital data being in the form of binary frames, the binary frames being sent out at the rate of a serial clock signal and being referenced by a synchronization signal, each serially exchanged word having a beginning and an end, the processor having a data bus, said interface circuit comprising:

at lease one buffer memory having a parallel data input, a parallel data output, an address input, a write control input and a read control input;

a first data transfer line connected to the parallel data input of the buffer memory;

a second data transfer line connected to the parallel data output of the buffer memory;

a conversion register having a rate set by the serial clock signal, a series port for connection to the peripheral device, and a parallel port, the parallel port being connected to one of said first and second data transfer lines, the data bus of the processor being connected to the other data transfer line;

a control means including a counter receiving the serial clock signal and the synchronization signal, the control means for generating a first address that is incremented substantially at the end of each serially exchanged word a first memory access control signal activated substantially at the end of each serially exchanged word, and a buffer memory selection signal; and selection means for, depending on the state of the buffer memory selection signal, transmitting said first address or a second address sourced from the processor to the address input of the at least one buffer memory, and for transmitting said first memory access control signal or a second memory access control signal sourced from the processor to a control input of the at lease one buffer memory.

2. The interface circuit according to claim 1 wherein said at least one buffer memory includes two buffer memories, each having a parallel data input connected to the first data transfer line, a parallel data output connected to the second data transfer line, an address input, a write control input and a read control input; and wherein said selection means, as a function of the buffer memory selection signal, respectively transmits said first address and said first memory access control signal to the address and control inputs of a selected one of the two buffer memories, and respectively transmits the second address and the second memory access control signal to the address and control inputs of the other buffer memory.

3. The interface circuit according to either claim 1 or 2, wherein said at least one buffer memory has a capacity, and wherein the control means includes means for modifying the state of the buffer memory selection signal when a number of frames corresponding to the capacity has been exchanged.

4. The interface circuit according to claim 3, wherein the control means receives a validation signal from the processor and includes means for modifying the state of the buffer memory selection signal when the validation signal is in a predetermined state.

5. The interface circuit according to claim 4, wherein the control means includes means for transmitting an end-of-transmission signal to the processor substantially at the same time as the state of the buffer memory selection signal is modified.

6. The interface circuit according to claim 5, wherein the processor outputs a processor clock signal, and wherein the interface circuit further comprises means to generate the serial clock signal and the synchronization signal from the processor clock signal so that the serial clock signal has a lower frequency than the processor clock signal.

7. The interface circuit according to claim 6, wherein:

said second data transfer line is connected to the parallel port of the conversion register and said first data transfer line is connected to the processor data bus;

said first memory access control signal is transmitted selectively by the selection means to the read control input of the at least one buffer memory and said second memory access control signal is transmitted selectively by the selection means to the write control input of the at least one buffer memory, whereby data is transmitted serially from the processor to the peripheral device.

8. An interface circuit according to claim 6, wherein:

said first data transfer line is connected to the parallel port of the conversion register and said second data transfer line is connected to the data bus of the processor;

wherein said first memory access control signal is transmitted selectively by the selection means to the write control input of the at least one buffer memory; and wherein said second memory access control signal is transmitted selectively by the selection means to the read control input of the at least one buffer memory, whereby the processor receives data transmitted serially by the peripheral device.

9. The interface circuit according to claim 3, wherein the control means includes means for transmitting an end-of-transmission signal to the processor substantially at the same time as the state of the buffer memory selection signal is modified.

10. The interface circuit according to claim 1 where in:

said at least one buffer memory includes two buffer memories, each having a parallel data input connected to the first data transfer line, a parallel data output connected to the second data transfer line, an address input a write control input and read control input;

said selection means, as a function of the buffer memory selection signal, respectively transmits said first address and said first memory access control signal to the address and control inputs of a selected one of the two buffer memories, and respectively transmits the second address and the second memory access control signal to the address and control inputs of the other buffer memory;

said at least one buffer memory has a capacity, and wherein the control means includes means for modifying the state of the buffer memory selection signal when a number of frames corresponding to the capacity has been exchanged;

the control means receives a validation signal from the processor and includes means for modifying the state of the buffer memory selection signal when the validation signal is in a predetermined state; and the control means includes means for transmitting an end-of-transmission signal to the processor substantially at the same time as the state of the buffer memory selection signal is modified.

11. The interface circuit according to claim 1 wherein the processor outputs a processor clock signal, and wherein the interface circuit further comprises means to generate the serial clock signal and the synchronization signal from the processor clock signal so that the serial clock signal has a lower frequency than the processor clock signal.

12. The interface circuit according to claim 1 wherein:

said second data transfer line is connected to the parallel port of the conversion register and said first data transfer line is connected to the processor data bus;

said first memory access control signal is transmitted selectively by the selection means to the read control input of the at least one buffer memory; and said second memory access control signal is transmitted selectively by the selection means to the write control input of the at least one buffer memory, whereby data is transmitted serially from the processor to the peripheral device.

13. An interface circuit according to claim 1 wherein:

said first data transfer line is connected to the parallel port of the conversion register and said second data transfer line is connected to the data bus of the processor;

wherein said first memory access control signal is transmitted selectively by the selection means to the write control input of the at least one buffer memory; and wherein said second memory access control signal is transmitted selectively by the selection means to the read control input of the at least one buffer memory, whereby the processor receives data transmitted serially by the peripheral device.

14. An interface circuit associated with a processor for a two-way serial exchange of words of digital data between the processor and a peripheral device, the processor having a data bus, the data elements being in the form of binary frames transmitted at the rate of a serial clock signal and being referenced by a synchronization signal, each serially exchanged word having a beginning and an end, the interface circuit comprising:

at least one transmission buffer memory and at least one reception buffer memory, each buffer memory having a parallel data input, a parallel data output, an address input, a write control input and a read control input, the data output of the reception buffer memory and the data input of the transmission buffer memory each being connected to the processor data bus;

a parallel/series conversion register having its rate set by the serial clock signal and having a series output for connection to the peripheral device and a parallel input connected to the data output of the transmission buffer memory;

a series/parallel conversion register having its rate set by the serial clock signal and having a series input for connection to the peripheral device and a parallel output connected to the data input of the reception buffer memory;

control means including a counter receiving the serial clock signal and the synchronization signal, the control means for producing
a first read address incremented substantially at the end of each word transmitted serially towards the peripheral device,
a first read control signal activated substantially at the end of each word transmitted serially towards the peripheral device,
a first write address incremented substantially at the end of each word received serially from the peripheral device,
a first write control signal activated substantially at the end of each word received serially from the peripheral device,
a transmission buffer memory selection signal, and
a reception buffer memory selection signal;

transmission selection means for, depending on the state of the transmission buffer memory selection signal, transmitting
said first read address or a second write address coming from the processor to the address input of the transmission buffer memory, and
said first read control signal to the read control input of the transmission buffer memory or a second write control signal from the processor to the write control input of the transmission buffer memory; and reception selection means for, depending on the state of the reception buffer memory selection signal, transmitting
said first write address or a second read address coming from the processor to the address input of the reception buffer memory and
said first write control signal to the write control input of the reception buffer memory or a second read control signal coming from the processor to the read control input of the reception buffer memory.

15. The interface circuit according to claim 14, wherein said at least one transmission buffer memory comprises two transmission buffer memories and said at least one reception buffer memory comprises two reception buffer memories, each of the buffer memories having a parallel data input, a parallel data output, an address input, a write control input and a read control input; and wherein the data outputs of the reception buffer memories and the data inputs of the transmission buffer memories are connected to the data bus of the processor;

the parallel input of the parallel/series conversion register is connected to the data outputs of the two transmission buffer memories;

the parallel output of the series/parallel conversion register is connected to the data inputs of the two reception buffer memories;

the transmission selection means includes means, responsive to the transmission buffer memory selection signal, for respectively transmitting said first read address and said first read control signal to the address and read control inputs of one of the transmission buffer memories, and respectively transmitting the second write address and the second write control signal from the processor to the address and write control inputs of the other transmission buffer memory; and the reception selection means includes means, responsive to the reception buffer memory selection signal, for respectively transmitting said first write address and said first write control signal to the address and write control inputs of one of the reception buffer memories, and respectively transmitting the second read address and second read control signal from the processor to the address and read control inputs of the other reception buffer memory.

16. The interface circuit according to either claim 14 or 15, wherein said first write control signal and said first read control signal are the same signal, and wherein said first write address has a value equal to said first read address and is transmitted at a time differing from transmission of said first read address by about one half-cycle of the serial clock signal.

17. The interface circuit according to claim 16, wherein each transmission buffer memory has a capacity, and wherein the control means includes means for modifying the state of the transmission buffer memory selection signal when a number of frames corresponding to the capacity of a transmission buffer memory has been transmitted serially to the peripheral device and for modifying the state of the reception buffer memory selection signal about one half-cycle of the serial clock signal after having modified the state of the transmission buffer memory selection signal.

18. The interface circuit according to either claim 14 or 17, wherein said second write address and said second read address are the same address from the processor.

* * * * *